P. J. GORDON & R. T. PRALL.
FURNACE.
APPLICATION FILED DEC. 4, 1911.

1,021,144.

Patented Mar. 26, 1912.

4 SHEETS—SHEET 2.

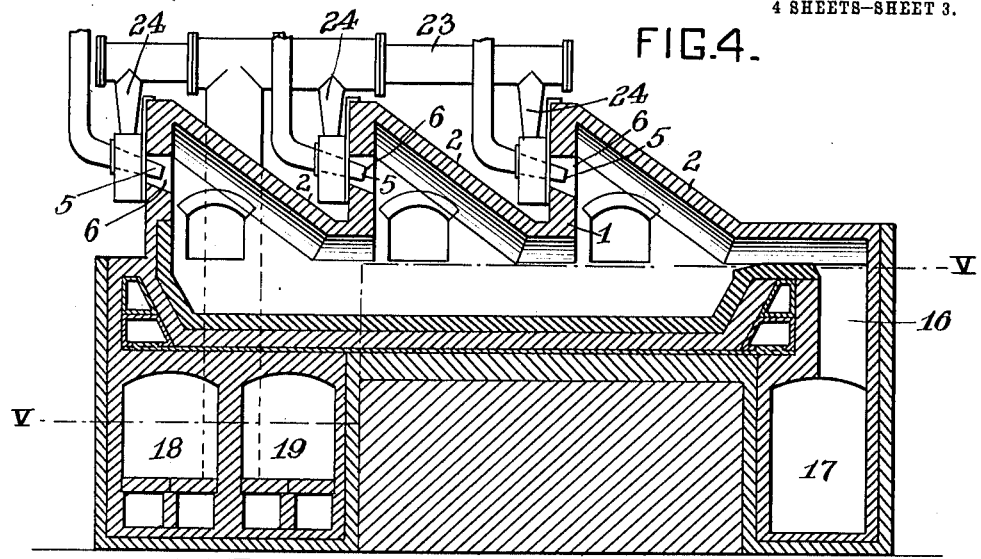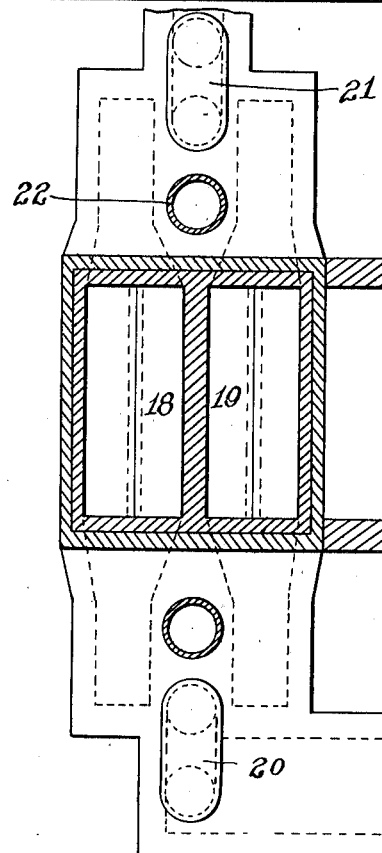

P. J. GORDON & R. T. PRALL.
FURNACE.
APPLICATION FILED DEC. 4, 1911.

1,021,144.

Patented Mar. 26, 1912.

4 SHEETS—SHEET 4.

UNITED STATES PATENT OFFICE.

PETER J. GORDON AND RALPH T. PRALL, OF YOUNGSTOWN, OHIO.

FURNACE.

1,021,144.  Specification of Letters Patent.  Patented Mar. 26, 1912.

Application filed December 4, 1911. Serial No. 663,850.

*To all whom it may concern:*

Be it known that we, PETER J. GORDON and RALPH T. PRALL, residing at Youngstown, in the county of Mahoning and State of Ohio, citizens of the United States, have invented or discovered certain new and useful Improvements in Furnaces, of which improvements the following is a specification.

The invention described herein relates to certain improvements in furnaces and has for its object a construction whereby the products of combustion, etc., are diverted toward the hearth and delayed in their movement toward the outlet from the furnace, such diversion and retardation being effected preferably at two or more points.

It is a further object of the invention to provide for an introduction of heat into the furnace at a series of two or more points in advance of the points of diversion and retardation.

The invention is hereinafter more fully described and claimed.

Figure 1:
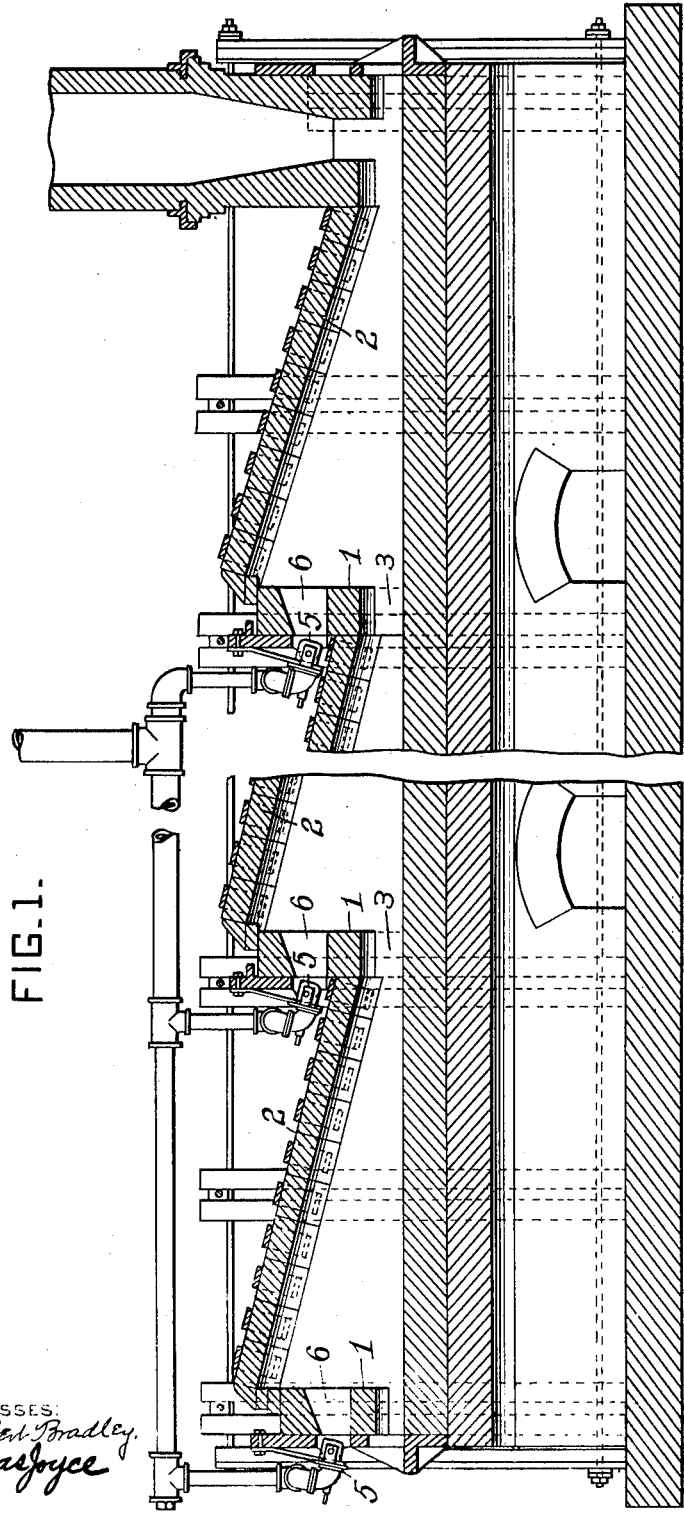
Figure 2:
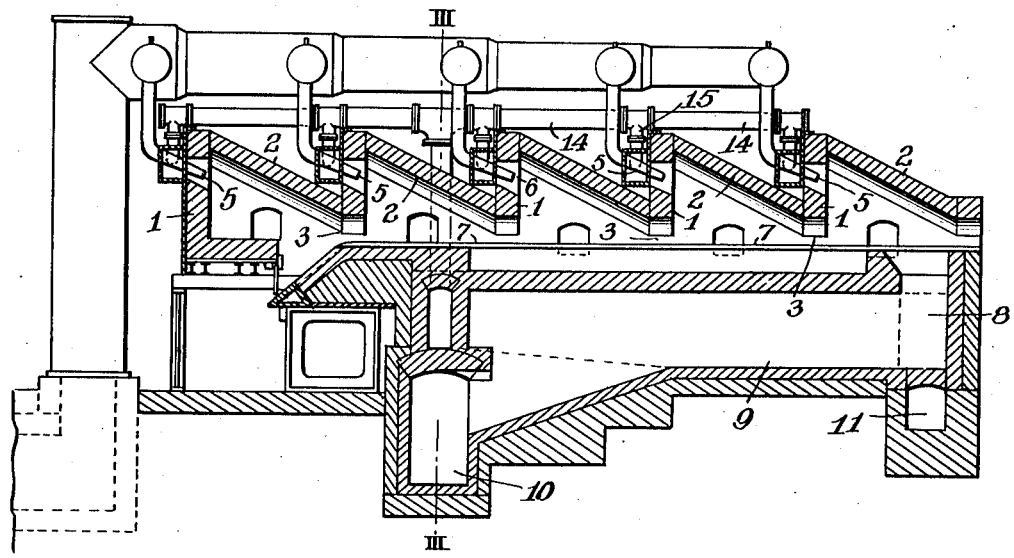
Figure 3:
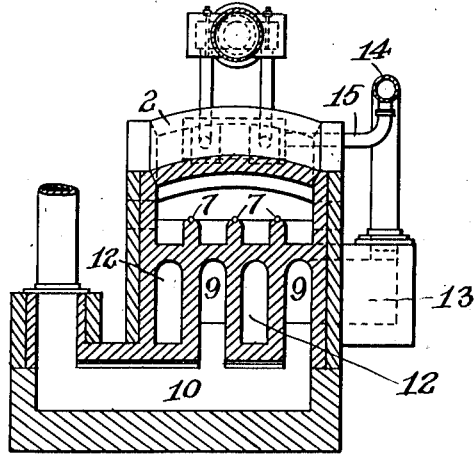
Figure 6:
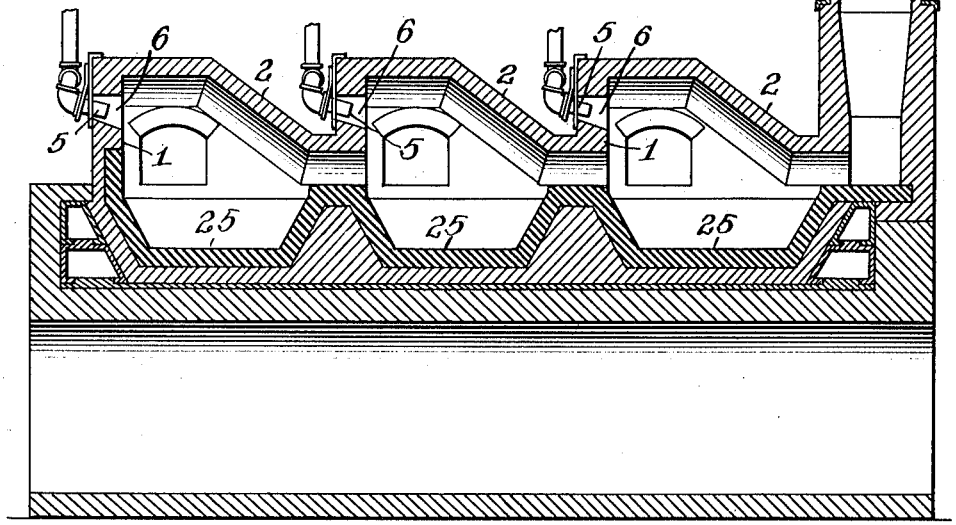
Figure 7:
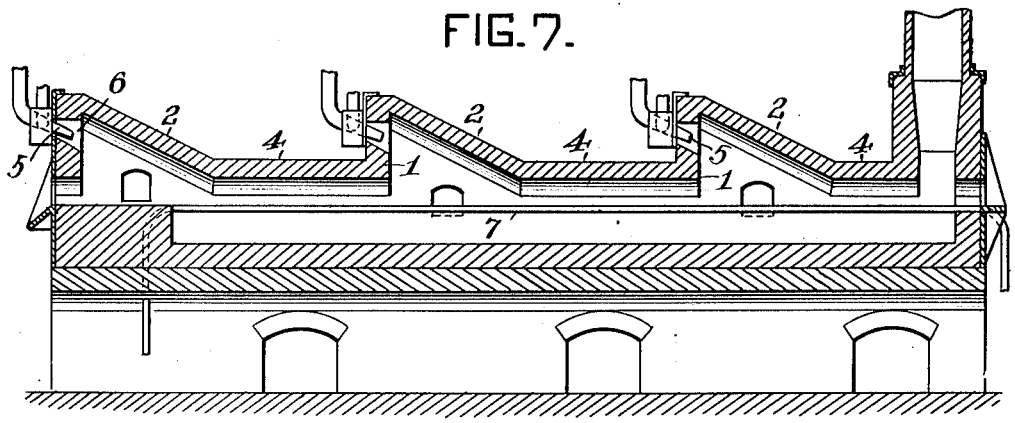

In the accompanying drawings forming a part of this specification Figure 1 is a sectional elevation of a heating furnace embodying our improvements; Fig. 2 is a sectional elevation of our improved billet heating furnace and having incorporated therewith means for preheating the air; Fig. 3 is a transverse section on a plane indicated by the line III—III Fig. 2; Fig. 4 is a sectional elevation of an open hearth furnace having our improvements applied thereto; Fig. 5 is a sectional plan the plane of section being indicated by the line V—V Fig. 4; Fig. 6 is a sectional elevation of a puddling furnace embodying our improvements and Fig. 7 is a sectional elevation of a furnace embodying a modification of our improvements.

In the practice of our invention, the furnace is constructed as regards the side walls and hearth 1 in the usual or any suitable manner and in accordance with the purpose for which it is to be used. The roof however is formed in series of sections, the number of such sections being dependent to some extent on the length of the furnace. As shown in the several views each section consists of a vertical or approximately vertical cross wall 1, supported on the side walls in any suitable manner, and an inclined wall 2. The vertical wall extends down toward the hearth so as to form in connection with the hearth or the material lying on the hearth a throat or contracted passage 3. It will be understood that the proximity of the lower edge of the vertical walls to the hearth will be controlled in the case of a heating furnace in part by the height of the article to be heated, but in all cases the passages or throats should not be so constricted as to prevent a free flow of gases, etc., toward the stack. The sections 2 of the furnace top are inclined downwardly from one vertical wall toward the hearth. It is preferred that the top sections 2 should have their higher ends supported by the cross walls and should extend down to the lower edges of the next adjacent walls, as shown in Figs. 1 and 2, although the lower edges of the inclined sections and cross walls may be connected by portions 4 parallel or approximately parallel with the hearth, as shown in Fig. 7.

The furnace is heated by oil, gas or any other suitable fuel introduced through openings 6 in the vertical walls by burners 5 suitably constructed in accordance with the kind of fuel employed. These burners are preferably so arranged that the flames, etc., will impinge against the inclined top sections and be diverted downwardly toward the hearth. It has been found in practice that by properly adjusting the burners a swirl will be imparted to the flames, etc., by reason of impingement on the sections 2 and that the swirling action will effect a retardation of the flow through the constricted passages 3. It will be observed that retardation occurs when the flame, products of combustion, etc., are most closely adjacent to the material to be heated and will therefore be more effective, and will impart a uniform temperature throughout the furnace.

The articles to be heated may be moved through the furnace either in the direction of flow of the products of combustion or in opposition thereto as will be seen by reference to Fig. 1, in which is shown a furnace suitable for heating long or short lengths, dependent on the position while passing through the furnace.

In Figs. 2 and 3 is shown a furnace suitably constructed for heating billets, which are moved laterally through the furnace while supported in longitudinally arranged tubes 7. In these figures is shown a construction whereby the air employed for the combustion of the oil or gas is preheated by the products of combustion. At one end the furnace is provided with a downtake 8 for the products of combustion, which pass along horizontal flues 9 toward the opposite end of the furnace into a common cross flue 10 to the stack. The air to be heated enters by the cross flue 11 flows along flues 12 alternating with the flues 9, to a cross flue 13 which is connected to pipe 14 having branch connections 15 to the burners.

As shown in Figs. 4 and 5 our improvements may be applied to open hearth furnaces, which however are not reversible, or in other words the flow of products of combustion through the melting chamber is always in the same direction. Provision may be made for heating the air for example by the employment of regenerating chambers heated by the products of combustion as also shown in Figs. 4 and 5. The downtakes 16 are connected to a flue 17 which can be connected alternately with the chambers 18 and 19 by suitable valve mechanism 20. These chambers are adapted to be alternately connected to the stack by a reversible valve mechanism 21. The heated air is conducted by an uptake 22 to a pipe 23 having branches 24 leading to the burners 5.

Our improvement is adapted to be applied to puddling furnaces, especially to that class or kind having a plurality of hearths 25, as shown in Fig. 6.

It will be readily understood by those skilled in the art, that the inclined top section 2 may be so constructed and arranged that deflection and retardation may be effected at any desired point relative to the charge or material being heated.

We claim herein as our invention:

1. A furnace having a roof provided with a series of portions inclined downwardly in combination with burners discharging directly into the furnace between inclined portions whereby the normal flow of the products of combustion, etc. are deflected toward the hearth.

2. A furnace having a roof provided with a series of portions inclined downwardly and a series of burners arranged to direct the flame, etc. at an acute angle against such inclined portions.

3. A furnace having a roof consisting of a series of substantially vertical cross walls and a series of inclined top sections intermediate the vertical walls in combination with burners discharging into the furnace intermediate the vertical walls.

4. A furnace having a roof consisting of a series of substantially vertical cross walls and a series of intermediate downwardly inclined top sections in combination with a series of burners arranged to direct the flame and products of combustion at an acute angle against the inclined top sections.

5. A furnace having a roof consisting of a series of substantially vertical cross walls provided with openings and a series of intermediate downwardly inclined top sections in combination with burners arranged in line with openings in the cross walls and to direct the flame, etc. against the inclined sections.

In testimony whereof we have hereunto set our hands.

PETER J. GORDON.
RALPH T. PRALL.

Witnesses:
G. C. SHACKLEFORD,
JOHN W. WRIGHT.